United States Patent
Christensen

(10) Patent No.: US 11,796,227 B2
(45) Date of Patent: Oct. 24, 2023

(54) REFRIGERATION SYSTEM WITH OIL CONTROL SYSTEM

(71) Applicant: Hill Phoenix, Inc., Conyers, GA (US)

(72) Inventor: Kim G. Christensen, Aarhus V (DK)

(73) Assignee: Hill Phoenix, Inc., Conyers, GA (US)

( * ) Notice: Subject to any disclaimer, the term of this patent is extended or adjusted under 35 U.S.C. 154(b) by 48 days.

(21) Appl. No.: 16/418,148

(22) Filed: May 21, 2019

(65) Prior Publication Data

US 2019/0360727 A1 Nov. 28, 2019

Related U.S. Application Data

(60) Provisional application No. 62/675,868, filed on May 24, 2018.

(51) Int. Cl.

| | |
|---|---|
| *F25B 9/00* | (2006.01) |
| *C09K 5/04* | (2006.01) |
| *F25B 1/10* | (2006.01) |
| *F25B 31/00* | (2006.01) |
| *F25B 43/02* | (2006.01) |

(52) U.S. Cl.
CPC .............. *F25B 9/008* (2013.01); *C09K 5/041* (2013.01); *F25B 1/10* (2013.01); *F25B 31/004* (2013.01); *F25B 43/02* (2013.01); *C09K 2205/106* (2013.01); *F25B 2309/06* (2013.01); *F25B 2400/23* (2013.01)

(58) Field of Classification Search
CPC ...... F25B 31/002; F25B 31/004; F25B 9/008; F25B 1/10; F25B 2309/06; F25B 2400/23; F25B 43/02; C09K 5/041; C09K 2205/106
See application file for complete search history.

(56) References Cited

U.S. PATENT DOCUMENTS

| | | | |
|---|---|---|---|
| 4,270,363 A | | 6/1981 | Maring et al. |
| 4,589,263 A | | 5/1986 | DiCarlo et al. |
| 4,827,789 A | | 5/1989 | Hallidy et al. |
| 4,928,500 A | * | 5/1990 | Funahashi ............. F25B 31/002 62/193 |
| 5,369,958 A | * | 12/1994 | Kasai ................... F25B 31/004 62/158 |

(Continued)

FOREIGN PATENT DOCUMENTS

| | | |
|---|---|---|
| EP | 1367259 A1 | 12/2003 |
| EP | 1443286 A1 | 8/2004 |

(Continued)

OTHER PUBLICATIONS

Extended European Search Report and Search Opinion regarding Application No. EP 19176127.9, dated Sep. 30, 2019, 7 pps.

(Continued)

*Primary Examiner* — Tavia Sullens
(74) *Attorney, Agent, or Firm* — Fish & Richardson P.C.

(57) ABSTRACT

A $CO_2$ refrigeration system includes a plurality of compressors configured to circulate a $CO_2$ refrigerant, a suction line configured to deliver the $CO_2$ refrigerant to the compressors, an oil separator configured to separate oil from the $CO_2$ refrigerant, and an oil return line configured to deliver the oil from the oil separator to the suction line. The oil mixes with the $CO_2$ refrigerant in the suction line before reaching the compressors.

27 Claims, 3 Drawing Sheets

(56) References Cited

U.S. PATENT DOCUMENTS

| | | |
|---|---|---|
| 5,425,246 A | 6/1995 | Bessler |
| 5,539,382 A | 7/1996 | Duff et al. |
| 5,673,570 A * | 10/1997 | Sada .................... F25B 31/002 62/468 |
| 6,385,980 B1 | 5/2002 | Sienel |
| 6,415,611 B1 | 7/2002 | Acharya et al. |
| 6,418,735 B1 | 7/2002 | Sienel |
| 7,065,979 B2 | 6/2006 | Arshansky et al. |
| 7,406,837 B2 | 8/2008 | Nemoto et al. |
| 7,913,506 B2 | 3/2011 | Bittner et al. |
| 8,011,192 B2 | 9/2011 | Gupte |
| 8,511,103 B2 | 8/2013 | Welch |
| 8,631,666 B2 | 1/2014 | Hinde et al. |
| 8,756,947 B2 | 6/2014 | Chen et al. |
| 8,966,934 B2 | 3/2015 | Christensen |
| 9,121,631 B2 | 9/2015 | Cho et al. |
| 9,151,521 B2 | 10/2015 | Bittner |
| 9,335,079 B2 | 5/2016 | Huff et al. |
| 9,353,980 B2 | 5/2016 | Ignatiev |
| 9,395,112 B2 | 7/2016 | Prins |
| 9,470,435 B2 | 10/2016 | Hinde et al. |
| 9,541,311 B2 | 1/2017 | Hinde et al. |
| 9,625,183 B2 | 4/2017 | Wallace et al. |
| 9,657,977 B2 | 5/2017 | Hinde et al. |
| 9,664,424 B2 | 5/2017 | Hinde et al. |
| 9,689,590 B2 | 6/2017 | Christensen |
| 2003/0182961 A1 | 10/2003 | Nishida et al. |
| 2005/0011221 A1 | 1/2005 | Hirota |
| 2005/0178150 A1 | 8/2005 | Oshitani et al. |
| 2005/0217278 A1 | 10/2005 | Mongia et al. |
| 2005/0268625 A1 | 12/2005 | Sienel et al. |
| 2007/0199337 A1 | 8/2007 | Otake et al. |
| 2008/0006044 A1 | 1/2008 | Tan |
| 2008/0098754 A1 | 5/2008 | Sommer et al. |
| 2008/0196420 A1 | 8/2008 | Gernemann |
| 2008/0264077 A1 | 10/2008 | Heinbokel |
| 2010/0000245 A1 | 1/2010 | Kasahara et al. |
| 2010/0199707 A1 | 8/2010 | Pearson |
| 2010/0263393 A1 | 10/2010 | Chen et al. |
| 2011/0036110 A1 | 2/2011 | Fujimoto et al. |
| 2011/0041527 A1 | 2/2011 | Jakobsen et al. |
| 2011/0138831 A1 * | 6/2011 | Ogata .................... F25B 31/004 62/193 |
| 2011/0162397 A1 | 7/2011 | Huff et al. |
| 2011/0314843 A1 | 12/2011 | Heinbokel et al. |
| 2012/0000237 A1 | 1/2012 | Yamada et al. |
| 2012/0011866 A1 | 1/2012 | Scarcella et al. |
| 2012/0055182 A1 | 3/2012 | Dube |
| 2012/0073319 A1 | 3/2012 | Dube |
| 2012/0192579 A1 | 8/2012 | Huff et al. |
| 2012/0247148 A1 | 10/2012 | Dube |
| 2013/0125569 A1 | 5/2013 | Verma et al. |
| 2013/0233009 A1 | 9/2013 | Dube |
| 2013/0298593 A1 | 11/2013 | Christensen |
| 2014/0007603 A1 | 1/2014 | Dube |
| 2014/0116075 A1 | 5/2014 | Prins |
| 2014/0157811 A1 | 6/2014 | Shimazu et al. |
| 2014/0208785 A1 | 7/2014 | Wallace et al. |
| 2014/0291411 A1 | 10/2014 | Tamaki et al. |
| 2014/0326018 A1 | 11/2014 | Ignatiev |
| 2014/0352343 A1 | 12/2014 | Hinde et al. |
| 2015/0052927 A1 | 2/2015 | Yang et al. |
| 2015/0128628 A1 | 5/2015 | Kawagoe et al. |
| 2015/0345835 A1 | 12/2015 | Martin et al. |
| 2015/0354882 A1 | 12/2015 | Dube |
| 2016/0102901 A1 | 4/2016 | Christensen et al. |
| 2016/0238294 A1 * | 8/2016 | Hellmann .................... F25B 43/02 |
| 2016/0245575 A1 | 8/2016 | Dube |
| 2017/0363337 A1 | 12/2017 | Swofford et al. |
| 2018/0216851 A1 | 8/2018 | Christensen et al. |
| 2019/0368786 A1 | 12/2019 | Newel et al. |
| 2020/0033039 A1 | 1/2020 | Krishnamoorthy et al. |

FOREIGN PATENT DOCUMENTS

| | | |
|---|---|---|
| EP | 1 789 732 | 5/2007 |
| EP | 1 848 933 | 12/2010 |
| EP | 2407734 | 1/2012 |
| EP | 2 078 178 A1 | 5/2016 |
| EP | 2 329 206 A2 | 10/2016 |
| EP | 2 212 631 A1 | 12/2016 |
| GB | 2 460 726 | 12/2009 |
| JP | 2004-257694 A | 9/2004 |
| JP | 2005-024210 A | 1/2005 |
| JP | 2011-503504 A | 1/2011 |
| WO | WO-2006/087011 | 8/2006 |
| WO | WO-2006/091190 | 8/2006 |
| WO | WO-2009/086493 A2 | 7/2009 |
| WO | WO-2010/045743 A1 | 4/2010 |
| WO | WO-2011/066214 A1 | 6/2011 |
| WO | WO 2011/071959 | 6/2011 |
| WO | WO-2013/169591 A1 | 11/2013 |
| WO | WO-2014/068967 A1 | 5/2014 |
| WO | WO-2014/179699 A1 | 11/2014 |

OTHER PUBLICATIONS

Co2oltec, A world first in technology: Refrigeration with CO2, special print from KK Die Kalte & Klimatechnik, Edition Feb. 2005, 15 pps.

Heat recovery from CO2 based refrigeration systems, Advansor Energisystemer, dated Mar. 26, 2008, 5 pps.

Heos user manual for high efficiency showcase controller, Carel Industries, dated Sep. 24, 2015, 56 pps.

Office Action in European Appln. No. 19176127.9, dated Mar. 17, 2022, 6 pages.

Office Action in European Appln. No. 19176127.9, dated Feb. 28, 2023, 5 pages.

* cited by examiner

REFRIGERATION SYSTEM WITH OIL CONTROL SYSTEM

CROSS-REFERENCE TO RELATED PATENT APPLICATION

This application claims the benefit of and priority to U.S. Provisional Patent Application No. 62/675,868 filed May 24, 2018, the entire disclosure of which is incorporated by reference herein.

BACKGROUND

The present disclosure relates generally to a refrigeration system and more particularly to a refrigeration system that uses carbon dioxide (i.e., $CO_2$) as a refrigerant. The present disclosure relates more particularly still to a $CO_2$ refrigeration system with an oil control system.

Refrigeration systems are often used to provide cooling to temperature controlled display devices (e.g. cases, merchandisers, etc.) in supermarkets and other similar facilities. Vapor compression refrigeration systems are a type of refrigeration system which provides such cooling by circulating a fluid refrigerant (e.g., a liquid and/or vapor) through a thermodynamic vapor compression cycle. In a vapor compression cycle, the refrigerant is typically compressed to a high temperature high pressure state (e.g., by a compressor of the refrigeration system), cooled/condensed to a lower temperature state (e.g., in a gas cooler or condenser which absorbs heat from the refrigerant), expanded to a lower pressure (e.g., through an expansion valve), and evaporated to provide cooling by absorbing heat into the refrigerant. $CO_2$ refrigeration systems are a type of vapor compression refrigeration system that use $CO_2$ as a refrigerant.

Some $CO_2$ refrigeration systems include an oil management system which provides oil to one or more compressors of the refrigeration system. Oil management systems are typically either active or passive. Active oil control systems use an oil separator to remove oil from the refrigerant and then provide the oil directly to each compressor (e.g., via an oil line connecting the oil separator to each compressor). Passive oil control systems do not include an oil separator and allow the oil to remain mixed with the refrigerant throughout the refrigeration cycle.

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art and is not admitted to be prior art by inclusion in this section.

SUMMARY

One implementation of the present disclosure is a $CO_2$ refrigeration system that provides cooling for a refrigeration load using carbon dioxide ($CO_2$) as a refrigerant. The $CO_2$ refrigeration system includes a plurality of compressors configured to circulate the $CO_2$ refrigerant, a suction line configured to deliver the $CO_2$ refrigerant to the compressors, an oil separator configured to separate oil from the $CO_2$ refrigerant, and an oil return line configured to deliver the oil from the oil separator to the suction line. The oil mixes with the $CO_2$ refrigerant in the suction line before reaching the compressors.

In some embodiments, the $CO_2$ refrigeration system includes a plurality of oil equalization lines and a plurality of oil equalization valves. Each of the oil equalization lines may connect one of the compressors to the oil return line. Each of the oil equalization valves may be located along one of the oil equalization lines and configured to control a flow of oil through the oil equalization lines.

In some embodiments, the $CO_2$ refrigeration system includes a controller configured to periodically open and close the plurality of oil equalization valves. Opening the oil equalization valves may cause any excess oil within the compressors to flow into the oil equalization lines and equalizes an amount of oil within each of the compressors.

In some embodiments, the $CO_2$ refrigeration system includes an oil control valve located along the oil return line and configured to control a flow of oil from the oil separator to the suction line.

In some embodiments, the $CO_2$ refrigeration system includes an oil sensor configured to measure an amount of oil within the suction line.

In some embodiments, the $CO_2$ refrigeration system includes a controller configured to open and close the oil control valve based on the measured amount of oil within the suction line. The oil may be permitted to flow from the oil separator to the suction line when the oil control valve is open and may be prevented from flowing from the oil separator to the suction line when the oil control valve is closed.

In some embodiments, the controller is configured to open the oil control valve in response to a determination that the measured amount of oil within the suction line is less than an oil threshold and keep the oil control valve closed in response to a determination that the measured amount of the oil within the suction line is greater than or equal to the oil threshold.

Another implementation of the present disclosure is a method for operating a $CO_2$ refrigeration system that provides cooling for a refrigeration load using carbon dioxide ($CO_2$) as a refrigerant. The method includes operating a plurality of compressors to circulate the $CO_2$ refrigerant within the $CO_2$ refrigeration system, delivering the $CO_2$ refrigerant to the compressors via a suction line coupled to an inlet of the compressors, separating oil from the $CO_2$ refrigerant at an oil separator coupled to an outlet of the compressors via a discharge line, and delivering the oil from the oil separator to the suction line via an oil return line, wherein the oil mixes with the $CO_2$ refrigerant in the suction line before reaching the compressors.

In some embodiments, the method includes returning excess oil from the plurality of compressors to the oil return line via a plurality of oil equalization lines. Each oil equalization line may connect one of the compressors to the oil return line. The method may include operating a plurality of oil equalization valves to control a flow of the excess oil through the oil equalization lines. Each oil equalization valve may be located along one of the oil equalization lines.

In some embodiments, the method includes periodically opening and closing the plurality of oil equalization valves. Opening the oil equalization valves may cause any excess oil within the compressors to flow into the oil equalization lines and may equalize an amount of oil within each of the compressors.

In some embodiments, the method includes operating an oil control valve located along the oil return line to control a flow of oil from the oil separator to the suction line.

In some embodiments, the method includes measuring an amount of oil within the suction line via an oil sensor coupled to the suction line.

In some embodiments, operating the oil control valve includes opening and closing the oil control valve based on the measured amount of oil within the suction line. The oil may be permitted to flow from the oil separator to the suction line when the oil control valve is open and may be prevented from flowing from the oil separator to the suction line when the oil control valve is closed.

In some embodiments, operating the oil control valve includes opening the oil control valve in response to a determination that the measured amount of oil within the suction line is less than an oil threshold and keeping the oil control valve closed in response to a determination that the measured amount of the oil within the suction line is greater than or equal to the oil threshold.

Another implementation of the present disclosure is a controller for a $CO_2$ refrigeration system that provides cooling for a refrigeration load using carbon dioxide ($CO_2$) as a refrigerant. The controller includes one or more processors and one or more non-transitory computer-readable media storing instructions. When executed by the one or more processors, cause the one or more processors to perform operations including operating a plurality of compressors to circulate the $CO_2$ refrigerant within the $CO_2$ refrigeration system and obtaining a measurement of an amount of oil within a suction line coupled to an inlet of the compressors. The suction line contains a mixture of oil and the $CO_2$ refrigerant. The operations include comparing the amount of oil within the suction line to an oil threshold and operating an oil control valve to control a flow of oil from an oil separator to the compressor suction line. The oil from the oil separator mixes with the $CO_2$ refrigerant in the compressor suction line before reaching the compressors.

In some embodiments, operating the oil control valve includes opening the oil control valve in response to a determination that the amount of oil within the suction line is less than the oil threshold and keeping the oil control valve closed in response to a determination that the amount of the oil within the suction line is greater than or equal to the oil threshold.

In some embodiments, the operations include obtaining a second measurement of the amount of oil within the suction line after opening the oil control valve to release oil from the oil separator into the suction line and deactivating one or more components of the $CO_2$ refrigeration system in response to the second measurement of the amount of oil within the suction line being less than the oil threshold.

In some embodiments, the operations include opening a plurality of oil equalization valves connecting the plurality of compressors to an oil return line to equalize oil within each of the compressors and closing the plurality of oil equalization valves after a predetermined amount of time has elapsed.

In some embodiments, opening the plurality of oil equalization valves causes any excess oil from the plurality of compressors to return to the oil return line via a plurality of oil equalization lines. Each oil equalization line may connect one of the compressors to the oil return line.

In some embodiments, the oil return line receives both the flow of oil from the oil separator and a flow of oil from the oil equalization lines and delivers oil to the suction line.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
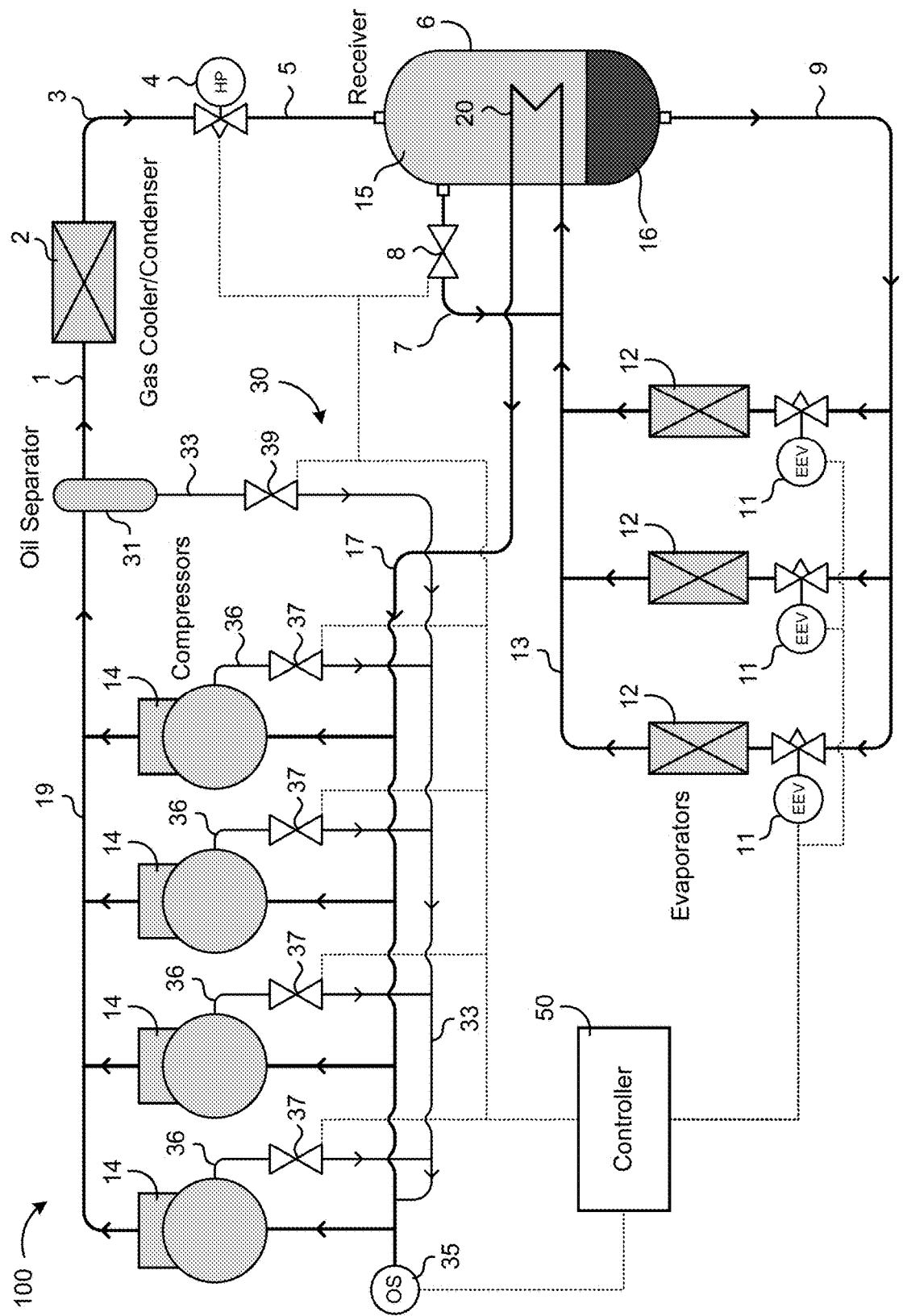
FIG. 1 is a block diagram of a $CO_2$ refrigeration system that includes an semi-passive oil control system, according to an exemplary embodiment.

Referring generally to the FIGURES, a $CO_2$ refrigeration system is shown, according to various exemplary embodiments. The $CO_2$ refrigeration system may be a vapor compression refrigeration system which uses primarily carbon dioxide (i.e., $CO_2$) as a refrigerant. In some implementations, the $CO_2$ refrigeration system is used to provide cooling for temperature controlled display devices in a supermarket or other similar facility.

The $CO_2$ refrigeration system includes an oil control system. In some embodiments, the $CO_2$ refrigeration system and/or the oil control system include some or all of the features described in U.S. Provisional Patent Application No. 62/460,984 filed Feb. 20, 2017, the entire disclosure of which is incorporated by reference herein. The oil control system may include an oil separator configured to remove oil from the $CO_2$ refrigerant. In some embodiments, the oil control system uses a semi-active or semi-passive oil control technique. Unlike active oil control systems that provide oil directly to individual compressors, the oil control system may provide the oil from the oil separate into a refrigerant suction line that feeds into multiple compressors of the $CO_2$ refrigeration system. The oil may mix with the $CO_2$ refrigerant in the suction line before reaching the compressors.

In some embodiments, the oil control system includes several oil equalization lines, each of which connects a compressor of the $CO_2$ refrigeration system to an oil return line. The oil equalization lines may connect to the compressors at connection points defining a target level of oil within each compressor. The oil control system may include oil equalization valves located along each oil equalization line. The oil equalization valves can be opened simultaneously to equalize the amount of oil within each compressor. When the oil equalization valves are open, any oil within the compressors above the connection points may flow into the oil equalization lines and into the oil return line, whereas any oil below the connection points may remain within the compressors. The oil return line may then deliver any returned oil into the compressor suction line to mix with the refrigerant.

The oil control system may include an oil sensor configured to measure an amount or level of oil within the compressor suction line. If the measured amount of oil in the suction line is less than an oil threshold after the oil equalization procedure has been performed (e.g., two minutes later), an oil control valve may be opened to release oil from the oil separator into the oil return line, which delivers the oil to the compressor suction line. However, if the measured amount of oil in the suction line is greater than or equal to the oil threshold, the oil control valve may remain closed. If the amount of oil in the suction line does not reach the oil threshold after opening the oil control valve, an alarm may be generated and the $CO_2$ refrigeration system may be shutdown. These and other features of the $CO_2$ refrigeration system and the oil control system are described in greater detail below.

$CO_2$ Refrigeration System

Referring now to FIG. 1, a $CO_2$ refrigeration system 100 is shown, according to an exemplary embodiment. $CO_2$ refrigeration system 100 may be a vapor compression refrigeration system which uses primarily carbon dioxide ($CO_2$) as a refrigerant. However, it is contemplated that other refrigerants can be substituted for $CO_2$ without departing from the teachings of the present disclosure. $CO_2$ refrigeration system 100 and is shown to include a system of pipes, conduits, or other fluid channels (e.g., fluid conduits 1, 3, 5, 7, 9, 13, 17, and 19) for transporting the $CO_2$ refrigerant between various components of $CO_2$ refrigeration system 100. The components of $CO_2$ refrigeration system 100 are shown to include a gas cooler/condenser 2, a high pressure valve 4, a receiver 6, expansion valves 11, evaporators 12, and compressors 14.

Gas cooler/condenser 2 may be a heat exchanger or other similar device for removing heat from the $CO_2$ refrigerant. Gas cooler/condenser 2 is shown receiving $CO_2$ vapor from fluid conduit 1. In some embodiments, the $CO_2$ vapor in fluid conduit 1 may have a pressure within a range from approximately 45 bar to approximately 100 bar (i.e., about 640 psig to about 1420 psig), depending on ambient temperature and other operating conditions. In some embodiments, gas cooler/condenser 2 may partially or fully condense $CO_2$ vapor into liquid $CO_2$ (e.g., if system operation is in a subcritical region). The condensation process may result in fully saturated $CO_2$ liquid or a liquid-vapor mixture (e.g., having a thermodynamic quality between zero and one). In other embodiments, gas cooler/condenser 2 may cool the $CO_2$ vapor (e.g., by removing superheat) without condensing the $CO_2$ vapor into $CO_2$ liquid (e.g., if system operation is in a supercritical region). In some embodiments, the cooling/condensation process is an isobaric process. Gas cooler/condenser 2 is shown outputting the cooled and/or condensed $CO_2$ refrigerant into fluid conduit 3.

High pressure valve 4 receives the cooled and/or condensed $CO_2$ refrigerant from fluid conduit 3 and outputs the $CO_2$ refrigerant to fluid conduit 5. High pressure valve 4 may control the pressure of the $CO_2$ refrigerant in gas cooler/condenser 2 by controlling an amount of $CO_2$ refrigerant permitted to pass through high pressure valve 4. In some embodiments, high pressure valve 4 is a high pressure thermal expansion valve (e.g., if the pressure in fluid conduit 3 is greater than the pressure in fluid conduit 5). In such embodiments, high pressure valve 4 may allow the $CO_2$ refrigerant to expand to a lower pressure state. The expansion process may be an isenthalpic and/or adiabatic expansion process, resulting in a flash evaporation of the high pressure $CO_2$ refrigerant to a lower pressure, lower temperature state. The expansion process may produce a liquid/vapor mixture (e.g., having a thermodynamic quality between zero and one). In some embodiments, the $CO_2$ refrigerant expands to a pressure of approximately 38 bar (e.g., about 540 psig), which corresponds to a temperature of approximately 37° F. The $CO_2$ refrigerant then flows from fluid conduit 5 into receiver 6.

Receiver 6 collects the $CO_2$ refrigerant from fluid conduit 5. In some embodiments, receiver 6 may be a flash tank or other fluid reservoir. Receiver 6 includes a $CO_2$ liquid portion 16 and a $CO_2$ vapor portion 15 and may contain a partially saturated mixture of $CO_2$ liquid and $CO_2$ vapor. In some embodiments, receiver 6 separates the $CO_2$ liquid from the $CO_2$ vapor. The $CO_2$ liquid may exit receiver 6 through fluid conduit 9. Fluid conduit 9 may be liquid headers leading to expansion valves 11 and evaporators 12. The $CO_2$ vapor may exit receiver 6 through fluid conduit 7. Fluid conduit 7 is shown leading the $CO_2$ vapor to fluid conduit 13.

In various embodiments, any number of expansion valves 11, evaporators 12, and compressors 14 may be present. Expansion valves 11 may be electronic expansion valves or other similar expansion valves. Expansion valves 11 are shown receiving liquid $CO_2$ refrigerant from fluid conduit 9 and outputting the $CO_2$ refrigerant to evaporators 12. Expansion valves 11 may cause the $CO_2$ refrigerant to undergo a rapid drop in pressure, thereby expanding the $CO_2$ refrigerant to a lower pressure, lower temperature state. In some embodiments, expansion valves 11 may expand the $CO_2$ refrigerant to a pressure of approximately 30 bar. The expansion process may be an isenthalpic and/or adiabatic expansion process.

Evaporators 12 are shown receiving the cooled and expanded $CO_2$ refrigerant from expansion valves 11. In some embodiments, evaporators 12 may be associated with display cases/devices (e.g., if $CO_2$ refrigeration system 100 is implemented in a supermarket setting). Evaporators 12 may be configured to facilitate the transfer of heat from the display cases/devices into the $CO_2$ refrigerant. The added heat may cause the $CO_2$ refrigerant to evaporate partially or completely. According to one embodiment, the $CO_2$ refrigerant is fully evaporated in evaporators 12. In some embodiments, the evaporation process may be an isobaric process. Evaporators 12 are shown outputting the $CO_2$ refrigerant into discharge line 13, leading to a heat exchanger 20.

Heat exchanger 20 may be positioned within receiver 6 and configured to transfer heat between the $CO_2$ refrigerant entering heat exchanger 20 from discharge line 13 and the $CO_2$ refrigerant entering receiver 6 from fluid conduit 5. In some embodiments, heat exchanger 20 precools the $CO_2$ refrigerant within receiver 6 by transferring heat from the $CO_2$ refrigerant surrounding heat exchanger 20 into the $CO_2$ refrigerant within heat exchanger 20. The $CO_2$ refrigerant exiting heat exchanger 20 may pass into suction line 17. In other embodiments, heat exchanger 20 can be omitted and discharge line 13 may connect directly to suction line 17. Suction line 17 may provide the $CO_2$ refrigerant to compressors 14.

Compressors 14 may compress the $CO_2$ refrigerant into a superheated vapor having a pressure within a range of approximately 45 bar to approximately 100 bar. The output pressure from compressors 14 may vary depending on ambient temperature and other operating conditions. In some embodiments, compressors 14 operate in a transcritical mode. In operation, the $CO_2$ discharge gas exits compressors 14 and flows into discharge line 19. Discharge line 19 is shown providing the $CO_2$ refrigerant to an oil separator 31, which separates oil from the $CO_2$ refrigerant. The $CO_2$ refrigerant may exit oil separator 31 and flow through fluid conduit 1 into gas cooler/condenser 2. The oil separated from the $CO_2$ refrigerant may flow into an oil return line 33.

Still referring to FIG. 1, $CO_2$ refrigeration system 100 is shown to include a gas bypass valve 8. Gas bypass valve 8 may receive the $CO_2$ vapor from receiver 6 (via fluid conduit 7) and output the $CO_2$ refrigerant into discharge line 13. In some embodiments, the $CO_2$ vapor that is bypassed through gas bypass valve 8 is mixed with the $CO_2$ refrigerant gas exiting evaporators 12 (e.g., via discharge line 13). The combined $CO_2$ refrigerant gas may be provided to the suction side of compressors 14. In other embodiments, gas bypass valve 8 may output the $CO_2$ refrigerant into suction line 17. Compressors 14 may compress the $CO_2$ vapor passing through gas bypass valve 8 from a low pressure state (e.g., approximately 30 bar or lower) to a high pressure state (e.g., 45-100 bar).

Gas bypass valve 8 may be operated to regulate or control the pressure within receiver 6 (e.g., by adjusting an amount of $CO_2$ refrigerant permitted to pass through gas bypass valve 8). For example, gas bypass valve 8 may be adjusted (e.g., variably opened or closed) to adjust the mass flow rate, volume flow rate, or other flow rates of the $CO_2$ refrigerant through gas bypass valve 8. Gas bypass valve 8 may be opened and closed (e.g., manually, automatically, by a controller 50, etc.) as needed to regulate the pressure within receiver 6.

In some embodiments, gas bypass valve 8 includes a sensor for measuring a flow rate (e.g., mass flow, volume flow, etc.) of the $CO_2$ refrigerant through gas bypass valve 8. In other embodiments, gas bypass valve 8 includes an indicator (e.g., a gauge, a dial, etc.) from which the position of gas bypass valve 8 may be determined. This position may be used to determine the flow rate of $CO_2$ refrigerant through gas bypass valve 8, as such quantities may be proportional or otherwise related.

In some embodiments, gas bypass valve 8 may be a thermal expansion valve (e.g., if the pressure on the downstream side of gas bypass valve 8 is lower than the pressure in fluid conduit 7). According to one embodiment, the pressure within receiver 6 is regulated by gas bypass valve 8 to a pressure of approximately 38 bar, which corresponds to about 37° F. Advantageously, this pressure/temperature state may facilitate the use of copper tubing/piping for the downstream $CO_2$ lines of the system. Additionally, this pressure/temperature state may allow such copper tubing to operate in a substantially frost-free manner.

Oil Control System

Still referring to FIG. 1, $CO_2$ refrigeration system 100 is shown to include an oil control system 30. Oil control system 30 can be configured to monitor and control the oil delivered to compressors 14. In some embodiments, the oil control performed by oil control system 30 is semi-active or semi-passive. Active oil control systems typically use an oil separator to remove oil from the refrigerant and then provide the oil directly to each compressor (e.g., via an oil line connecting the oil separator to each compressor). Passive oil control systems typically do not include an oil separator and allow the oil to remain mixed with the refrigerant throughout the refrigeration cycle. Advantageously, the semi-active or semi-passive oil control performed by oil control system 30 may remove oil from the $CO_2$ refrigerant, but does not provide the oil directly to each compressor 14. Rather, the oil is returned to suction line 17 via oil return line 33 and mixed with the $CO_2$ refrigerant before the $CO_2$ refrigerant is provided to compressors 14.

Oil control system 30 is shown to include an oil separator 31. Oil separator 31 may be configured to separate oil from the compressed $CO_2$ refrigerant. In some embodiments, oil separator 31 is positioned downstream of compressors 14 (as shown in FIG. 1) such that oil separator 31 receives the compressed $CO_2$ refrigerant from discharge line 19. Oil separator 31 may remove oil from the compressed $CO_2$ refrigerant and may deliver the compressed $CO_2$ refrigerant into fluid conduit 1. In some embodiments, the oil separated from the $CO_2$ refrigerant is collected in oil separator 31. For example, the oil can be stored in an internal reservoir within oil separator 31. In other embodiments, the oil can be stored in an external reservoir separate from oil separator 31.

The oil separated from the $CO_2$ refrigerant by oil separator 31 may exit the internal or external oil reservoir via oil return line 33. Oil return line 33 connects oil separator 31 and/or the oil reservoir to suction line 17 where the oil mixes with the $CO_2$ refrigerant. The refrigerant/oil mixture then feeds into compressors 14. An oil control valve 39 (e.g., a solenoid valve) may be positioned along oil return line 33 and configured to control the flow of oil through oil return line 33. Oil control valve 39 can be operated by controller 50 (described in greater detail below) to control the release of oil from oil separator 31 into suction line 17.

Unlike active oil control systems that provide oil directly to individual compressors, oil control system 30 provides the oil into a refrigerant suction line 17 that feeds into multiple compressors 14 in parallel. The oil may mix with the $CO_2$ refrigerant in suction line 17 before reaching compressors 14. The flow of oil back to compressors 14 may be balanced such that each compressor 14 receives sufficient oil.

Still referring to FIG. 1, oil control system 30 is shown to include several oil equalization lines 36 and oil equalization valves 37. Each oil equalization line 36 connects one of compressors 14 to oil return line 33 and is configured to deliver oil and/or $CO_2$ refrigerant from the corresponding compressor 14 into oil return line 33. In some embodiments, oil equalization lines 36 are connected to the crank casings of compressors 14. Oil equalization lines 36 may connect to compressors 14 at connection points corresponding to the desired oil level (e.g., the maximum allowable oil level or maximum desirable oil level) within each of compressors 14. Accordingly, any oil within compressors 14 above the desired oil level (i.e., above the connection point) can flow into oil equalization lines 36 when valves 37 are opened, whereas any oil within compressors 14 below the desired oil level (i.e., below the connection point) may remain within compressors 14 when valves 37 are opened.

Each oil equalization valve 37 may be positioned along one of oil equalization lines 36 and can be operated (e.g., by controller 50) to control the flow of oil through the corresponding oil equalization line 36. In some embodiments, oil equalization valves 37 are periodically opened and closed by controller 50 to equalize the amount of oil within each of compressors 14. For example, when compressors 14 are running, all oil equalization valves 37 may be opened simultaneously for a predetermined amount of time (e.g., ten seconds) and subsequently closed after the predetermined amount of time has elapsed. If the oil level within any of compressors 14 is above the connection point, any oil above the connection point may flow into oil equalization lines 36, through oil equalization valves 37, and into oil return line 33 while valves 37 are open. If the level of oil within any of compressors 14 is below the connection point, any such compressors 14 may return only $CO_2$ refrigerant gas through oil equalization lines 36 when valves 37 are opened. In this way, the level of oil within each of compressors 14 is equalized. The process of opening and closing oil equalization valves 37 to equalize the amount of oil within compressors 14 is referred to herein as an oil equitation procedure.

In some embodiments, oil control system 30 includes an oil sensor 35. Oil sensor 35 may be located along suction line 17 and configured to measure the amount of oil within the refrigerant/oil mixture in suction line 17. Oil sensor 35 can be any of a variety of sensor types (e.g., optical, capacitive, dielectrical, resonance frequency, floating bulb, etc.) configured to sense the amount of oil in the refrigerant/oil mixture in suction line 17. In some embodiments, oil sensor 35 uses a frequency sweep technique to sense oil, either as a mist or as a liquid oil level, within suction line 17. For example, oil sensor 35 may be a Baumer frequency sweep sensor configured to sense the amount of oil in the oil/refrigerant mixture within suction line 17.

In some embodiments, oil sensor 35 is used to sense the amount of oil within suction line 17 shortly after the oil equalization procedure is performed. For example, oil sensor 35 may sense the amount of oil within suction line 17 approximately two minutes (or any other amount of time) after the oil equalization procedure is performed. Controller 50 may compare the oil measurement from oil sensor 35 with a threshold oil value. If the oil measurement is greater than or equal to the threshold oil value (i.e., the amount of oil within suction line 17 is above the threshold), controller 50 may cause oil control valve 39 to remain closed. However, if the oil measurement is less than the threshold oil value (i.e., the amount of oil within suction line 17 is below a threshold), controller 50 may cause oil control valve 39 to open for a predetermined amount of time (e.g., five seconds) to allow oil from oil separator 31 to flow into oil return line 33. In other embodiments, oil control valve 39 can be held open until the oil measurement obtained by oil sensor 35 reaches the threshold oil value rather than closing oil control valve after the predetermined amount of time has elapsed.

If the oil measurement from oil sensor 35 fails to reach the threshold oil value after opening oil control valve 39, controller 50 may generate an alarm indicating that insufficient oil is present within oil control system 30. Upon generating the alarm, controller 50 may automatically stop the operation of $CO_2$ refrigeration system 100 (e.g., by stopping compressors 14) to prevent any damage that could be caused by insufficient oil.

Oil Controller

Figure 2:
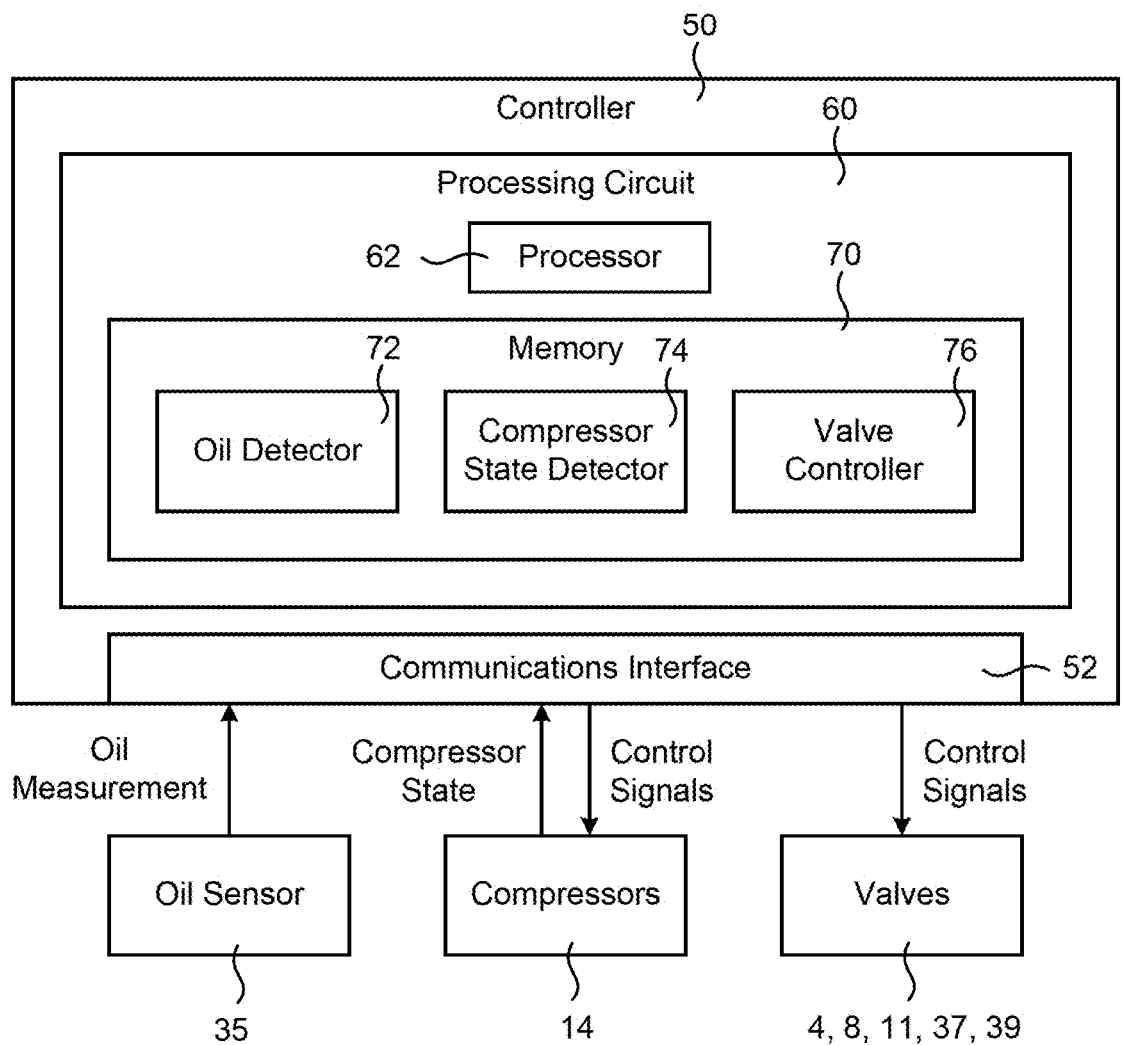
FIG. 2 is a block diagram of a controller configured to control the $CO_2$ refrigeration system and oil control system of FIG. 1, according to an exemplary embodiment.

Referring now to FIG. 2, a block diagram illustrating controller 50 in greater detail is shown, according to an exemplary embodiment. Controller 50 may receive signals from one or more measurement devices (e.g., pressure sensors, temperature sensors, flow sensors, etc.) located within $CO_2$ refrigeration system 100. For example, controller 50 is shown receiving an oil measurement from oil sensor 35. Controller 50 may also receive a compressor state signal from one or more of compressors 14. The compressor state signals may indicate which of compressors 14 are running and which of compressors 14 are not running. Controller 50 may use the oil measurement and the compressor states to determine appropriate control actions for control devices of $CO_2$ refrigeration system 100 (e.g., compressors 14, valves 4, 8, 11, 37, and 39, flow diverters, power supplies, etc.).

In some embodiments, controller 50 is configured to operate gas bypass valve 8 to maintain the $CO_2$ pressure within receiver 6 at a desired setpoint or within a desired range. In some embodiments, controller 50 operates gas bypass valve 8 based on the temperature of the $CO_2$ refrigerant at the outlet of gas cooler/condenser 2. In other embodiments, controller 50 operates gas bypass valve 8 based a flow rate (e.g., mass flow, volume flow, etc.) of $CO_2$ refrigerant through gas bypass valve 8. Controller 50 may use a valve position of gas bypass valve 8 as a proxy for $CO_2$ refrigerant flow rate. In some embodiments, controller 50 operates high pressure valve 4 and expansion valves 11 to regulate the flow of refrigerant in system 100. In some embodiments, controller 50 operates valves 37 and 39 to regulate the flow of oil in oil control system 30.

Controller 50 may include feedback control functionality for adaptively operating the various components of $CO_2$ refrigeration system 100. For example, controller 50 may receive a setpoint (e.g., a temperature setpoint, a pressure setpoint, a flow rate setpoint, a power usage setpoint, etc.) and operate one or more components of system 100 to achieve the setpoint. The setpoint may be specified by a user (e.g., via a user input device, a graphical user interface, a local interface, a remote interface, etc.) or automatically determined by controller 50 based on a history of data measurements. In some embodiments, controller 50 includes some or all of the features of the controller described in P.C.T. Patent Application No. PCT/US2016/044164 filed Jul. 27, 2016, and/or U.S. Provisional Patent Application No. 62/460,984 filed Feb. 20, 2017, the entire disclosures of which are incorporated by reference herein.

Controller 50 may be a proportional-integral (PI) controller, a proportional-integral-derivative (PID) controller, a pattern recognition adaptive controller (PRAC), a model recognition adaptive controller (MRAC), a model predictive controller (MPC), or any other type of controller employing any type of control functionality. In some embodiments, controller 50 is a local controller for $CO_2$ refrigeration system 100. In other embodiments, controller 50 is a supervisory controller for a plurality of controlled subsystems (e.g., a refrigeration system, an AC system, a lighting system, a security system, etc.). For example, controller 50 may be a controller for a comprehensive building management system incorporating $CO_2$ refrigeration system 100. Controller 50 may be implemented locally, remotely, or as part of a cloud-hosted suite of building management applications.

Still referring to FIG. 2, controller 50 is shown to include a communications interface 52 and a processing circuit 60. Communications interface 52 can be or include wired or wireless interfaces (e.g., jacks, antennas, transmitters, receivers, transceivers, wire terminals, etc.) for conducting electronic data communications. For example, communications interface 52 may be used to conduct communications with gas bypass valve 8, oil sensor 35, compressors 14, valves 11, 37, and 39, high pressure valve 4, various data acquisition devices within $CO_2$ refrigeration system 100 (e.g., temperature sensors, pressure sensors, flow sensors, etc.) and/or other external devices or data sources. Data communications may be conducted via a direct connection (e.g., a wired connection, an ad-hoc wireless connection, etc.) or a network connection (e.g., an Internet connection, a LAN, WAN, or WLAN connection, etc.). For example, communications interface 52 can include an Ethernet card and port for sending and receiving data via an Ethernet-based communications link or network. In another example, communications interface 52 can include a Wi-Fi transceiver or a cellular or mobile phone transceiver for communicating via a wireless communications network.

Processing circuit 60 is shown to include a processor 62 and memory 70. Processor 62 can be implemented as a general purpose processor, an application specific integrated circuit (ASIC), one or more field programmable gate arrays (FPGAs), a group of processing components, a microcontroller, or other suitable electronic processing components.

Memory 70 (e.g., memory device, memory unit, storage device, etc.) may be one or more devices (e.g., RAM, ROM, solid state memory, hard disk storage, etc.) for storing data and/or computer code for completing or facilitating the various processes, layers and modules described in the present application. Memory 70 may be or include volatile memory or non-volatile memory. Memory 70 may include database components, object code components, script components, or any other type of information structure for supporting the various activities and information structures described in the present application. According to an exemplary embodiment, memory 70 is communicably connected to processor 62 via processing circuit 60 and includes computer code for executing (e.g., by processing circuit 60 and/or processor 62) one or more processes or control features described herein.

Still referring to FIG. 2, controller 50 is shown to include an oil detector 72 and a compressor state detector 74. Oil detector 72 can be configured to detect the level or amount of oil within suction line 17 based on the oil measurement from oil sensor 35. For example, oil detector 72 can determine whether the amount or level of oil within the oil/refrigerant mixture in suction line 17 exceeds a threshold oil level. Compressor state detector 74 can be configured to detect the state of each of compressors 14. For example, compressor state detector 74 can determine whether each of compressors 14 is currently running or not running.

Controller 50 is shown to include a valve controller 76. Valve controller 76 may receive input from oil detector 72 indicating the current oil amount or level within suction line 17. Valve controller 76 may also receive input from compressor state detector 74 indicating the current state of each of compressors 14. Valve controller 76 can generate control signals for one or more of valves 4, 8, 11, 37, and 39 based on the current oil amount/level and/or the current state of compressors 14.

In some embodiments, valve controller 76 causes oil equalization valves 37 to open and close periodically. For example, valve controller 76 can cause oil equalization valves 37 to open for a predetermined amount of time (e.g., ten seconds) at a periodic interval (e.g., every thirty minutes). The predetermined amount of time and the periodic interval are adjustable and can be set to any amount of time, as may be desirable in various implementations. In some embodiments, valve controller 76 causes all of oil equalization valves 37 to open simultaneously. After the predetermined amount of time has expired, valve controller 76 may cause oil equalization valves 37 to close simultaneously. As described above, opening and closing oil equalization valves 37 may equalize the amount of oil within each of compressors 14.

In some embodiments, valve controller 76 uses the oil measurement from oil sensor 35 to generate control signals for oil control valve 39. For example, valve controller 76 can compare the oil measurement from oil sensor 35 to an oil threshold. Valve controller 76 may open oil control valve 39 in response to a determination that the amount of oil within suction line 17 is less than the oil threshold. Opening oil control valve 39 may cause oil to be dispensed from oil separator 31 and flow into suction line 17 via oil return line 33. However, if the amount of oil within suction line 17 is greater than or equal to the oil threshold, valve controller 76 may cause oil control valve 39 to remain closed.

Oil Control Process

Figure 3:
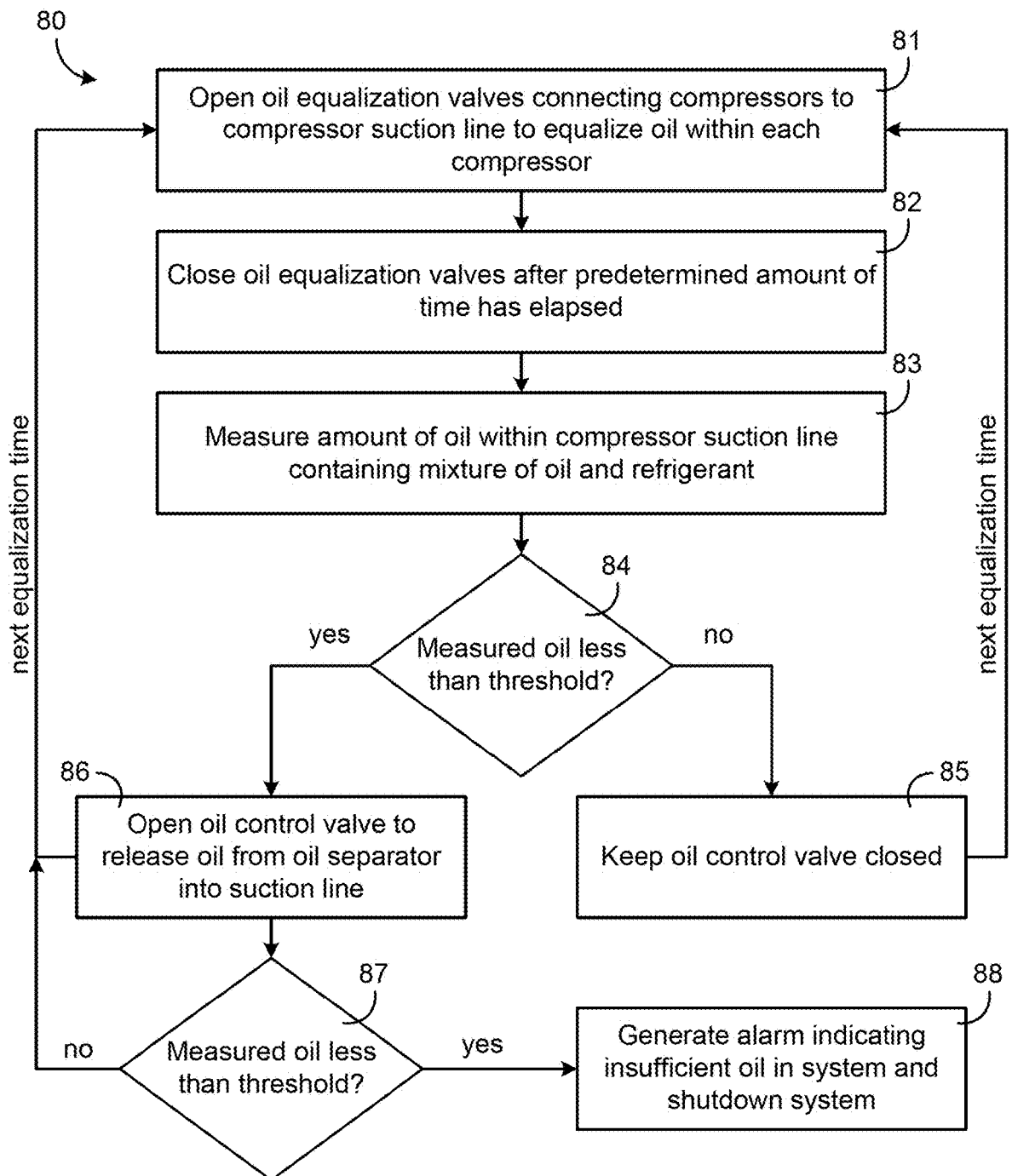
FIG. 3 is a flowchart of an oil control process which can be performed by the oil control system of FIG. 1 and the controller of FIG. 2, according to an exemplary embodiment.

Referring now to FIG. 3, a block diagram of an oil control process 80 is shown, according to an exemplary embodiment. Process 80 can be performed by one or more components of $CO_2$ refrigeration system 100. In some embodiments, process 80 is performed by controller 50, as described with reference to FIGS. 1-2.

Process 80 is shown to include opening oil equalization valves 37 connecting compressors 14 to compressor suction line 17 to equalize oil within each compressor 14 (step 81) and closing oil equalization valves 37 after a predetermined amount of time has elapsed (step 82). Step 81 may include opening oil equalization valves 37 simultaneously to allow oil from within each compressor 14 to flow through oil equalization lines 36 and into oil return line 33. When oil equalization valves 37 are open, any excess oil within compressors 14 may flow into oil equalization lines 36 and into oil return line 33. Excess oil may include any oil within compressors 14 above the point at which oil equalization lines 37 connect to compressors 14. Any oil within compressors 14 below the connection point may remain in compressors 14. In some embodiments, steps 81 and 82 are performed periodically (e.g., every ten minutes, every thirty minutes, etc.). The predetermined amount of time for which valves 37 are held open may be configurable and can be set to any desired value (e.g., ten seconds, five seconds, thirty seconds, etc.)

Process 80 is shown to include measuring an amount of oil within a compressor suction line 17 containing a mixture of oil and refrigerant (step 83). In some embodiments, step 83 is performed by oil sensor 35. Oil sensor 35 can sense the amount of oil within suction line 17 and can provide an oil measurement to controller 50. In some embodiments, step 83 is performed a predetermined amount of time (e.g., two minutes) after oil equalization valves 37 are opened and closed. For example, process 80 may include waiting for two minutes (or any other amount of time) after step 82 is performed before advancing to step 83. This may allow the oil within suction line 17 to equilibrate before oil sensor 35 is used to measure the amount of oil.

Process 80 is shown to include comparing the measured amount of oil to an oil threshold (step 84). If the measured amount of oil within suction line 17 is not less than the oil threshold (i.e., the measured amount of oil is greater than or equal to the oil threshold), controller 50 may cause oil control valve 39 to remain closed (step 85) and process 80 may return to step 81 at the next equalization time (e.g., after thirty minutes). However, if the measured amount of oil within suction line 17 is less than the oil threshold, controller 50 may cause oil control valve 39 to open to release oil from oil separator 31 and into suction line 17 via oil return line 33 (step 86). In some embodiments, oil control valve 39 is held open for a predetermined amount of time (e.g., five seconds, ten seconds, etc.) and then closed. In other embodiments, oil control valve 39 is held open until the measured amount of oil reaches the oil threshold.

After opening oil control valve 39, the amount of oil within suction line 17 can be measured again and compared with the oil threshold (step 87). In some embodiments, step 87 is performed a predetermined amount of time (e.g., two minutes) after oil control valve 39 is opened. For example, process 80 may include waiting for two minutes (or any other amount of time) after step 86 is performed before advancing to step 87. This may allow the oil within suction line 17 to equilibrate before oil sensor 35 is used to measure the amount of oil.

If the measured amount of oil within suction line 17 is not less than the oil threshold (i.e., the measured amount of oil is greater than or equal to the oil threshold), controller 50 may determine that there is sufficient oil in system 100 and process 80 may return to step 81. However, if the measured amount of oil within suction line 17 is less than the oil threshold, controller 50 may generate an alarm indicating insufficient oil and may shutdown system 100 (step 88). Process 80 may be repeated again at the next equalization time (e.g., thirty minutes later or at any other periodic interval).

Configuration of Exemplary Embodiments

The construction and arrangement of the $CO_2$ refrigeration system as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A $CO_2$ refrigeration system that provides cooling for a refrigeration load using carbon dioxide ($CO_2$) as a refrigerant, the $CO_2$ refrigeration system comprising:
a plurality of compressors configured to circulate the $CO_2$ refrigerant within the $CO_2$ refrigeration system;
a suction line fluidly coupled to the plurality of compressors and configured to deliver at least a portion of the $CO_2$ refrigerant to at least one of the plurality of compressors positioned downstream of the suction line;
an oil separator configured to separate oil from the $CO_2$ refrigerant;
an oil return line configured to deliver a flow of oil from the oil separator to the suction line to mix the oil with the $CO_2$ refrigerant upstream of the plurality of compressors;
a plurality of oil equalization lines, each oil equalization line positioned to fluidly couple at least one of the plurality of compressors to the oil return line and deliver a flow of oil from at least one of the plurality of compressors to the oil return line;
a plurality of oil equalization valves, each oil equalization valve located along one of the oil equalization lines and configured to control the flow of oil through the oil equalization lines;

an oil control valve located along the oil return line and configured to control the flow of oil from the oil separator to the suction line, the oil control valve configured to permit the flow of oil from the oil separator to the suction line when the oil control valve is in an open state, and the oil control valve is configured to prevent the flow of the oil from the oil separator to the suction line when the oil control valve is in a closed state;

an oil sensor fluidly coupled to the suction line and configured to measure an amount of oil within the suction line upstream of the plurality of compressors; and a controller configured to perform operations comprising:
based on the measurement by the oil sensor, determining the amount of oil within the suction line;
comparing the determined amount of oil within the suction line to a threshold amount;
based on a result of the comparison, periodically opening the plurality of oil equalization valves to cause a flow of excess oil from the plurality of compressors into the plurality of oil equalization lines to equalize an amount of oil within each compressor of the plurality of compressors;
adjusting the oil control valve to the open state in response to the determination that the amount of oil within the suction line is less than the threshold amount; and
maintaining the oil control valve in the closed state in response to the determination that the amount of the oil within the suction line is greater than or equal to the threshold amount.

2. The $CO_2$ refrigeration system of claim 1, further comprising a discharge line configured to receive the $CO_2$ refrigerant and the oil from the plurality of compressors and to conduct the $CO_2$ refrigerant and the oil to the oil separator.

3. The $CO_2$ refrigeration system of claim 1, wherein the controller is further configured to perform operations comprising:
maintaining the oil control valve in the closed state based on the determination that a measured amount of oil within the suction line is greater than or equal to the threshold amount.

4. The $CO_2$ refrigeration system of claim 1, wherein the oil sensor is configured to transmit a signal representing the measured amount of oil within the suction line to the controller.

5. The $CO_2$ refrigeration system of claim 4, wherein the controller is further configured to perform operations comprising:
receiving the signal representing the measured amount of oil within the suction line; and
determining the amount of oil within the suction line based on the measured amount of oil within the suction line.

6. The $CO_2$ refrigeration system of claim 4, wherein the oil sensor comprises at least one of an optical sensor, a capacitive sensor, a dielectrical sensor, a resonance frequency sensor, a floating bulb sensor, or a frequency sweep sensor.

7. The $CO_2$ refrigeration system of claim 4, wherein the amount of oil comprises one or more of an amount of an oil mist or an amount of an oil liquid.

8. The $CO_2$ refrigeration system of claim 1, wherein a flow of oil back to each of the plurality of compressors is balanced such that a level of oil is maintained above a minimum level in each of the plurality of compressors.

9. The $CO_2$ refrigeration system of claim 1, wherein the plurality of oil equalization lines are further configured to, when the amount of oil is below the threshold amount, only return $CO_2$ refrigerant from the plurality of compressors to the suction line.

10. The $CO_2$ refrigeration system of claim 9, wherein the threshold amount comprises a maximum allowable oil level or a maximum desirable oil level within each of the compressors.

11. The $CO_2$ refrigeration system of claim 1, wherein the controller is further configured to perform operations comprising stopping operation of the $CO_2$ refrigeration system when the amount of oil is less than a shutdown oil threshold.

12. The $CO_2$ refrigeration system of claim 1, wherein periodically opening the plurality of oil equalization valves comprises, after a predetermined amount of time:
adjusting the plurality of oil equalization valves to an open state; and
subsequent to adjusting the plurality of oil equalization valves to an open state, adjusting the plurality of oil equalization valves to a closed state.

13. A $CO_2$ refrigeration system that provides cooling for a refrigeration load using carbon dioxide ($CO_2$) as a refrigerant, the $CO_2$ refrigeration system comprising:
a plurality of compressors configured to circulate the $CO_2$ refrigerant within the $CO_2$ refrigeration system;
a suction line fluidly coupled to the plurality of compressors and configured to deliver at least a portion of the $CO_2$ refrigerant to at least one of the plurality of compressors positioned downstream of the suction line;
an oil separator configured to separate oil from the $CO_2$ refrigerant;
an oil return line configured to deliver a flow of oil from the oil separator to the suction line to mix the oil with the $CO_2$ refrigerant upstream of the plurality of compressors;
a plurality of oil equalization lines, each oil equalization line positioned to fluidly couple at least one of the plurality of compressors to the oil return line and deliver a flow of oil from at least one of the plurality of compressors to the oil return line;
a plurality of oil equalization valves, each oil equalization valve located along one of the oil equalization lines and configured to control the flow of oil through the oil equalization lines;
an oil control valve located along the oil return line and configured to control the flow of oil from the oil separator to the suction line;
an oil sensor fluidly coupled to the suction line and configured to measure a first amount of oil within the suction line upstream of the plurality of compressors at a first time and a second amount of oil within the suction line upstream of the plurality of compressors at a second time, the second time different than the first time; and
a controller configured to perform operations comprising:
based on the measurement by the oil sensor, determining the first amount of oil within the suction line;
comparing the determined first amount of oil within the suction line to a threshold amount;
based on a result of the comparison, periodically opening the plurality of oil equalization valves to cause a flow of excess oil from the plurality of compressors into the plurality of oil equalization lines to equalize an amount of oil within each compressor of the plurality of compressors, determining the second amount of oil within the suction line at the second time, the second time after periodically opening the plurality of oil equalization valves to cause the flow of excess oil from the plurality of compressors into the plurality of oil equalization lines to equalize the amount of oil within each compressor of the plurality of compressors at the first time;

comparing the determined second amount of oil within the suction line to the threshold amount; and based on a result of the second comparison, operating an oil control valve located along the oil return line to control the delivery of the separated oil from the oil separator to the suction line by opening the oil control valve to cause the flow of oil from the oil separator into the suction line.

14. A method for operating a refrigeration system that provides cooling for a refrigeration load using carbon dioxide ($CO_2$) refrigerant, the method comprising:

operating a plurality of compressors to circulate the $CO_2$ refrigerant within the refrigeration system;

delivering a portion of the $CO_2$ refrigerant to at least one of the plurality of compressors via a suction line fluidly coupled to each inlet of at least one of the plurality of compressors, the suction line upstream of the plurality of compressors;

separating oil from the $CO_2$ refrigerant at an oil separator;

measuring an amount of oil within the suction line upstream of the plurality of compressors with an oil sensor;

based on the measurement by the oil sensor, determining the amount of oil within the suction line;

comparing the determined amount of oil within the suction line to a threshold amount;

based on a result of the comparison, periodically opening a plurality of oil equalization valves to cause a flow of excess oil from the plurality of compressors into a plurality of oil equalization lines;

delivering the flow of excess oil from at least one of the plurality of compressors through the oil equalization lines to an oil return line;

mixing the flow of excess oil with the $CO_2$ refrigerant in the suction line;

equalizing an amount of oil within each compressor of the plurality of compressors with the mixed flow of excess oil and the $CO_2$ refrigerant from the suction line; and operating an oil control valve located along the oil return line to control the delivery of the separated oil from the oil separator to the suction line by:

opening the oil control valve in response to the determination that the amount of oil within the suction line is less than the threshold amount; and keeping the oil control valve closed in response to a determination that the amount of the oil within the suction line is greater than or equal to the threshold amount.

15. The method of claim 14, further comprising flowing the $CO_2$ refrigerant and oil from the plurality of compressors through a discharge line to the oil separator, the discharge line configured to receive the $CO_2$ refrigerant and the oil from the plurality of compressors.

16. The method of claim 14, wherein determining an amount of oil within the suction line further comprises receiving a signal representing the measured amount of oil within the suction line from the oil sensor coupled to the suction line.

17. The method of claim 16, wherein the oil sensor comprises at least one of an optical sensor, a capacitive sensor, a dielectrical sensor, a resonance frequency sensor, a floating bulb sensor, or a frequency sweep sensor.

18. The method of claim 16, wherein measuring the amount of oil within the suction line comprises one or more of an amount of an oil mist or an amount of an oil liquid.

19. The method of claim 14, wherein the oil is permitted to flow from the oil separator to the suction line when the oil control valve is open and prevented from flowing from the oil separator to the suction line when the oil control valve is closed.

20. The method of claim 14, further comprising maintaining the oil control valve closed when the amount of oil within the suction line is greater than or equal to the threshold amount.

21. The method of claim 14, wherein the threshold amount comprises a maximum allowable oil level or a maximum desirable oil level within each of the plurality of compressors.

22. The method of claim 14, further comprising balancing a flow of oil back to each of the plurality of compressors such that a level of oil is maintained above a minimum level in each of the plurality of compressors.

23. The method of claim 14, further comprising returning only $CO_2$ refrigerant from the plurality of compressors to the suction line by the plurality of oil equalization lines when the amount of oil is below an oil threshold.

24. The method of claim 14, further comprising shutting down the $CO_2$ refrigeration system when the amount of oil is less than a shutdown oil threshold.

25. The method of claim 14, further comprising, after periodically opening the plurality of oil equalization valves closing the plurality of oil equalization valves after a predetermined amount of time.

26. The method of claim 14, further comprising flowing the oil from the oil separator into a portion of the oil return line;

flowing the oil from the plurality of oil equalization lines into the portion of the oil return line; and delivering the oil from the oil separator and the oil from the plurality of oil equalization lines in the portion of the oil return line to the suction line.

27. A method for operating a refrigeration system that provides cooling for a refrigeration load using carbon dioxide ($CO_2$) refrigerant, the method comprising:

operating a plurality of compressors to circulate the $CO_2$ refrigerant within the refrigeration system;

delivering a portion of the $CO_2$ refrigerant to at least one of the plurality of compressors via a suction line fluidly coupled to each inlet of at least one of the plurality of compressors, the suction line upstream of the plurality of compressors;

separating oil from the $CO_2$ refrigerant at an oil separator;

measuring a first amount of oil within the suction line upstream of the plurality of compressors at a first time with an oil sensor;

based on the measurement by the oil sensor, determining the first amount of oil within the suction line;

comparing the determined first amount of oil within the suction line to a threshold amount;

based on a result of the comparison, periodically opening a plurality of oil equalization valves to cause a flow of excess oil from the plurality of compressors into a plurality of oil equalization lines;

delivering the flow of excess oil from at least one of the plurality of compressors through the oil equalization lines to an oil return line;

mixing the flow of excess oil with the $CO_2$ refrigerant in the suction line;

equalizing an amount of oil within each compressor of the plurality of compressors with the mixed flow of excess oil and the $CO_2$ refrigerant from the suction line;

measuring a second amount of oil within the suction line upstream of the plurality of compressors at a second time with the oil sensor, the second time after periodically opening the plurality of oil equalization valves to cause the flow of excess oil from the plurality of compressors into the plurality of oil equalization lines to equalize the amount of oil within each compressor of the plurality of compressors at the first time;

based on the measurement of the second amount by the oil sensor, determining the second amount of oil within the suction line;

comparing the determined second amount of oil within the suction line to the threshold amount; and based on a result of the second comparison, opening an oil control valve to deliver the separated oil from the oil separator into the suction line.

\* \* \* \* \*

UNITED STATES PATENT AND TRADEMARK OFFICE
CERTIFICATE OF CORRECTION

PATENT NO. : 11,796,227 B2
APPLICATION NO. : 16/418148
DATED : October 24, 2023
INVENTOR(S) : Kim G. Christensen Page 1 of 1

It is certified that error appears in the above-identified patent and that said Letters Patent is hereby corrected as shown below:

In the Claims

Column 18, Line 3, Claim 18, after "wherein" delete "measuring".

Signed and Sealed this
Twenty-seventh Day of February, 2024

Katherine Kelly Vidal
*Director of the United States Patent and Trademark Office*